US012671954B2

(12) United States Patent
Koppens

(10) Patent No.: US 12,671,954 B2
(45) Date of Patent: Jun. 30, 2026

(54) AUDIO APPARATUS AND METHOD THEREFOR

(71) Applicant: KONINKLIJKE PHILIPS N.V., Eindhoven (NL)

(72) Inventor: Jeroen Gerardus Henricus Koppens, Nederweert (NL)

(73) Assignee: Koninklijke Philips N.V., Eindhoven (NL)

( * ) Notice: Subject to any disclaimer, the term of this patent is extended or adjusted under 35 U.S.C. 154(b) by 244 days.

(21) Appl. No.: 18/520,818

(22) Filed: Nov. 28, 2023

(65) Prior Publication Data

US 2024/0214763 A1 Jun. 27, 2024

Related U.S. Application Data

(63) Continuation of application No. 17/437,859, filed as application No. PCT/EP2020/057014 on Mar. 16, 2020, now Pat. No. 11,889,286.

(30) Foreign Application Priority Data

Mar. 19, 2019 (EP) .................................... 19163714

(51) Int. Cl.
*H04S 7/00* (2006.01)
*H04R 5/02* (2006.01)
*H04R 5/04* (2006.01)

(52) U.S. Cl.
CPC ............... *H04S 7/303* (2013.01); *H04R 5/02* (2013.01); *H04R 5/04* (2013.01); *H04S 2400/11* (2013.01); *H04S 2420/01* (2013.01)

(58) Field of Classification Search
CPC .. H04S 7/303; H04S 2400/11; H04S 2420/01; H04R 5/02; H04R 5/04
USPC .................................... 381/56, 58, 303, 310
See application file for complete search history.

(56) References Cited

U.S. PATENT DOCUMENTS

2015/0057083 A1* 2/2015 Mehra ..................... A63F 13/54 463/35
2016/0006879 A1* 1/2016 Dickins ................. H04M 3/568 379/406.03
2020/0142665 A1* 5/2020 Dantrey .................. H04L 67/52
2020/0236487 A1* 7/2020 Kratz ....................... H04R 5/02
2020/0296532 A1* 9/2020 Wang ...................... A63F 13/54

* cited by examiner

*Primary Examiner* — William A Jerez Lora

(57) ABSTRACT

A first audio apparatus generates a data signal comprising data for an audio scene, the data comprising input audio source data for at least a first audio source and acoustic object data for at least one acoustic object in the audio scene, the acoustic object data comprising acoustic coupling data and spatial property data for the acoustic object. A second audio apparatus comprises a receiver (201) for receiving the signal. A generator (205) generates object audio source data for an object audio source representing audio emitted in the audio scene by the acoustic object from coupling of audio from the first audio source. The generator (205) is arranged to generate the object audio source data in response to the acoustic coupling data, the spatial property data, and the input audio source data. A renderer (203) renders the audio scene, the rendering including rendering the object audio source data.

30 Claims, 8 Drawing Sheets

AUDIO APPARATUS AND METHOD THEREFOR

CROSS-REFERENCE TO PRIOR APPLICATIONS

This application is a continuation of U.S. patent application Ser. No. 17/437,859 filed on Sep. 10, 2021 which is the U.S. National Phase application under 35 U.S.C. § 371 of International Application No. PCT/EP2020/057014, filed on Mar. 16, 2020, which claims the benefit of EP Patent Application No. EP 19163714.9, filed on Mar. 19, 2019. These applications are hereby incorporated by reference herein.

FIELD OF THE INVENTION

The invention relates to an audio apparatus and method therefor, and in particular, but not exclusively, to audio processing for an Augmented/Virtual Reality application.

BACKGROUND OF THE INVENTION

The variety and range of experiences based on audiovisual content have increased substantially in recent years with new services and ways of utilizing and consuming such content continuously being developed and introduced. In particular, many spatial and interactive services, applications and experiences are being developed to give users a more involved and immersive experience.

Examples of such applications are Virtual Reality (VR), Augmented Reality (AR), and Mixed Reality (MR) applications which are rapidly becoming mainstream, with a number of solutions being aimed at the consumer market. A number of standards are also under development by a number of standardization bodies. Such standardization activities are actively developing standards for the various aspects of VR/AR/MR systems including e.g. streaming, broadcasting, rendering, etc.

VR applications tend to provide user experiences corresponding to the user being in a different world/environment/scene whereas AR (including Mixed Reality MR) applications tend to provide user experiences corresponding to the user being in the current environment but with additional information or virtual objects or information being added. Thus, VR applications tend to provide a fully immersive synthetically generated world/scene whereas AR applications tend to provide a partially synthetic world/scene which is overlaid the real scene in which the user is physically present. However, the terms are often used interchangeably and have a high degree of overlap. In the following, the term Virtual Reality/VR will be used to denote both Virtual Reality and Augmented Reality.

As an example, a service being increasingly popular is the provision of images and audio in such a way that a user is able to actively and dynamically interact with the system to change parameters of the rendering such that this will adapt to movement and changes in the user's position and orientation. A very appealing feature in many applications is the ability to change the effective viewing position and viewing direction of the viewer, such as for example allowing the viewer to move and "look around" in the scene being presented.

Such a feature can specifically allow a virtual reality experience to be provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications, such as in the category of first person shooters, for computers and consoles.

It is also desirable, in particular for virtual reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

In addition to the visual rendering, most VR/AR applications further provide a corresponding audio experience. In many applications, the audio preferably provides a spatial audio experience where audio sources are perceived to arrive from positions that correspond to the positions of the corresponding objects in the visual scene. Thus, the audio and video scenes are preferably perceived to be consistent and with both providing a full spatial experience.

For example, many immersive experiences are provided by a virtual audio scene being generated by headphone reproduction using binaural audio rendering technology. In many scenarios, such headphone reproduction may be based on headtracking such that the rendering can be made responsive to the user's head movements, which highly increases the sense of immersion.

However, in order to provide a highly immersive, personalized, and natural experience to the user, it is important that the rendering of the audio scene is as realistic as possible, and for combined audiovisual experiences, such as many VR experiences, it is important that the audio experience closely matches that of the visual experience, i.e. that the rendered audio scene and video scene closely match.

In many applications, audiovisual data representing a scene is generated by one, often central, device and distributed to individual remote entities which may process the received audiovisual data to provide a local rendering for the specific user. Typically, it may for example adapt to the user's current movement, position and orientation in the scene, or to other localized parameters. Thus, in many applications, a local rendering and synthesis of the audio scene is performed based on received audio data.

To support such applications, a number of approaches and audio standards have been developed for the audio representation and data. In such approaches and standards, different audio components may often be represented individually together with spatial information. Different approaches for representing audio components and sources in the audio scene may be used in different standards and approaches.

For example, in the MPEG-I part 4 (Moving Picture Experts Group Immersive Audio Coding) standard under development, audio sources will be transmitted, to be used for rendering audio scenes where the user has 6 degrees of freedom (6DoF). These sound sources will be objects, channels and Higher Order Ambisonics (HOA).

Audio objects are representations of sound sources and thus are typically associated with the position of the sound source. In contrast, audio channels are representations of speaker signals. Typically, two or more audio channels are associated with each other and rendered at fixed positions. They typically represent one or more sound sources jointly wherein a sound source is represented by two or more audio channels such that amplitude panning causes a perceived localization between the positions of the two or more audio channels. For HOA, the audio representation is based on microphone principles where each HOA signal represents a (virtual) microphone with a certain directional characteristics. The directional characteristics are based on spherical harmonics and different signals of the HOA representation can thus be combined to result in an audio signal corresponding to the sound waves received from a certain direction. Therefore, where audio objects and audio channels are representative of audio emission, HOA is representative of audio being received at a certain point in space.

For audio objects a concept of extent is used to indicate the (3D) size of the sound source. Typically, objects are represented as single signals that are rendered as a point source, e.g. by convolving it with a single HRTF pair to perform a binaural processing. The extent parameter/feature allows the rendering to introduce a perceived width and height to the user.

HOA will likely contain acoustics and diffuse sounds in most bitstreams, but can also contain dry sound source components. Also, channels may either be dry sources or include acoustics (a dry sound source/signal may refer to one that has not been processed, i.e. time interval may correspond to the raw, unprocessed, original sound, refer. e.g. https://en.wikipedia.org/wiki/Audio_signal_processing). For object sources and some of the channels, the MPEG-I decoder must include an acoustic model to simulate the acoustics depending on the user's position.

However, whereas such approaches may provide efficient performance for many applications and in many scenarios, it is not optimal in all situations and scenarios. In some applications, suboptimal quality may be experienced, and the audio scene may be perceived as not completely natural or realistic. In some situations, the audio may not fully correspond to the provided video scene or may not fully correspond to that which would be perceived in a corresponding natural environment.

Hence, an improved approach for audio processing, in particular for a virtual/augmented/mixed reality experience/application, application, would be advantageous. In particular, an approach that allows improved operation, increased flexibility, reduced complexity, facilitated implementation, an improved audio experience, a more consistent perception of an audio and visual scene, improved customization, improved personalization; an improved virtual reality experience, improved audio quality, and/or improved performance and/or operation would be advantageous.

SUMMARY OF THE INVENTION

Accordingly, the Invention seeks to preferably mitigate, alleviate or eliminate one or more of the above mentioned disadvantages singly or in any combination.

According to an aspect of the invention, there is provided: an audio apparatus comprising: a receiver for receiving a signal comprising data for an audio scene, the data comprising input audio source data for at least a first audio source and acoustic object data for at least one acoustic object in the audio scene, the acoustic object data comprising acoustic coupling data and spatial property data for the acoustic object; a generator for generating object audio source data for an object audio source representing audio emitted in the audio scene by the acoustic object from coupling of audio from the first audio source, the generator being arranged to generate the object audio source data in response to the acoustic coupling data, the spatial property data, and the input audio source data; and a renderer for rendering the audio scene, the rendering including rendering the object audio source data.

The invention may provide improved audio rendering in many embodiments and may specifically provide an improved representation and rendering of an audio scene. In many scenarios a more realistic representation of a scene may be achieved, and an improved and/or more natural user experience may be achieved. In many embodiments, an effective processing may be achieved. The approach may be compatible with many other audio processing and rendering approaches and may provide an additional and complementary contribution to the audio presented to the user.

Coupling may reflect conversion of audio energy into vibration/mechanical energy and/or conversion of vibration/mechanical energy into audio energy, and the acoustic coupling data for the acoustic object may be indicative of a property of conversion of audio energy into vibration/mechanical energy and/or conversion of vibration/mechanical energy into audio energy for the acoustic object. The acoustic coupling data may include data indicative of a mechanical property of the acoustic object, including data indicating the material(s) and/or the configuration and/or the composition of the acoustic object.

The input audio source data may specifically comprise audio signal data and spatial property data for the first audio source. The object audio source data may comprise audio signal data and spatial property data for the object audio source. Spatial data for an audio source may be indicative of a position and/or extent of the audio source.

The generator be arranged to generate the object audio source data to correspond to an audio source having a spatial extension and/or position corresponding to a spatial extension and/or position indicated by the spatial property data for the audio component. The generator be arranged to generate the object audio source data to correspond to a level/frequency response determined from the acoustic coupling data (and the input audio signal data), such as specifically by filtering the input audio signal for the first audio source with a transfer function dependent on the acoustic coupling data.

According to an optional feature of the invention, the generator is arranged to generate the object audio source data to represent the object audio source having a spatial extent determined in response to the spatial property data.

This may provide improved rendering of the audio scene and may often lead to a more realistic perception of the audio scene. Specifically, the generator may generate the object audio source data to represent the object audio source having the same spatial extent as an extent of the acoustic object as indicated by the spatial property data.

According to an optional feature of the invention, the generator is arranged to determine at least one of an audio level and a frequency response for audio of the object audio source data in response to the acoustic coupling data.

This may provide improved rendering of the audio scene and may often lead to a more realistic perception of the audio scene.

According to an optional feature of the invention, the acoustic coupling data comprises a first set of coupling coefficients for the acoustic object, the set of coupling coefficients being indicative of a coupling transfer function for the acoustic object.

This may provide a particularly efficient and advantageous representation of the coupling effects. The set of coupling coefficients may describe a filter corresponding to a coupling transfer function. In some embodiments, the set of coupling coefficients may comprise only a single coefficient.

According to an optional feature of the invention, the coupling transfer function is from vibration of the acoustic object to audio emitted from the acoustic object.

This may provide a particularly advantageous and flexible representation of a coupling effect in many embodiments. It may provide a high degree of flexibility and allow many different effects to be represented and rendered.

According to an optional feature of the invention, the generator is arranged to generate object audio source data representing audio emitted in the audio scene by the acoustic object from a vibration of the audio object and the coupling transfer function.

This may provide a particularly advantageous and flexible representation of a coupling effect in many embodiments.

According to an optional feature of the invention, the generator is arranged to determine the vibration in response to a physical model of the acoustic object.

This may provide an improved and often more realistic audio scene to be rendered.

According to an optional feature of the invention, the generator is arranged to determine the vibration in response to a time varying force being applied to the acoustic object.

This may provide an improved and often more realistic audio scene to be rendered. It may in many embodiments allow additional effects and audio to be rendered such as for example audio being generated as a result of mechanical movement.

According to an optional feature of the invention, the coupling transfer function is from audio incident on the acoustic object to a vibration of the acoustic object.

This may provide a particularly advantageous and flexible representation of a coupling effect in many embodiments.

According to an optional feature of the invention, the generator is arranged to generate the object audio source data to represent the object audio source having a spatial position corresponding to a position of the acoustic object as indicated by the spatial property data.

This may provide improved rendering of the audio scene and may often lead to a more realistic perception of the audio scene. Specifically, the generator may generate the object audio source data to represent the object audio source having the same spatial position as a position of the acoustic object as indicated by the spatial property data.

According to an optional feature of the invention, the generator is arranged to generate the object audio source data in response to a position of the first audio source and a position of the acoustic object indicated by the spatial property data.

This may provide an improved rendering of an audio scene in many embodiments.

According to an optional feature of the invention, the generator is arranged to generate the object audio source data in response to a listening position and a position of the acoustic object indicated by the spatial property data.

This may provide an improved rendering of an audio scene in many embodiments.

According to an optional feature of the invention, the signal comprises input audio source data for a second audio source and the generator is arranged to generate the object audio source data to represent audio emitted in the audio scene by the acoustic object from a combined coupling of audio from the first audio source and the second audio source.

This may provide an improved rendering of an audio scene in many embodiments.

In many embodiments the generation of the object audio source data to represent audio emitted in the audio scene by the acoustic object from a combined coupling of audio from the first audio source and the second audio source may be by superposition of audio data generated in response to the acoustic coupling data, the spatial property data, and the input audio source data for the first audio source and audio data generated in response to the acoustic coupling data, the spatial property data, and the audio signal data for the second audio source.

According to an aspect of the invention, there is provided: an audio apparatus comprising: a data generator for generating data for an audio scene, the data comprising input audio source data for at least a first audio source and acoustic object data for at least one acoustic object in the audio scene, the acoustic object data comprising acoustic coupling data and spatial property data for the acoustic object; a signal generator for generating a data signal comprising the data for the audio scene; and a transmitter for transmitting the data signal.

According to an aspect of the invention, there is provided a method of processing audio, the method comprising: receiving a signal comprising data for an audio scene, the data comprising input audio source data for at least a first audio source and acoustic object data for at least one acoustic object in the audio scene, the acoustic object data comprising acoustic coupling data and spatial property data for the acoustic object; generating object audio source data for an object audio source representing audio emitted in the audio scene by the acoustic object from coupling of audio from the first audio source, the generator being arranged to generate the object audio source data in response to the acoustic coupling data, the spatial property data, and the input audio source data; and rendering the audio scene, the rendering including rendering the object audio source data.

According to an aspect of the invention, there is provided: a method of generating and audio data signal, the method comprising: generating data for an audio scene, the data comprising input audio source data for at least a first audio source and acoustic object data for at least one acoustic object in the audio scene, the acoustic object data comprising acoustic coupling data and spatial property data for the acoustic object; generating the audio data signal comprising the data for the audio scene; and transmitting the audio data signal.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
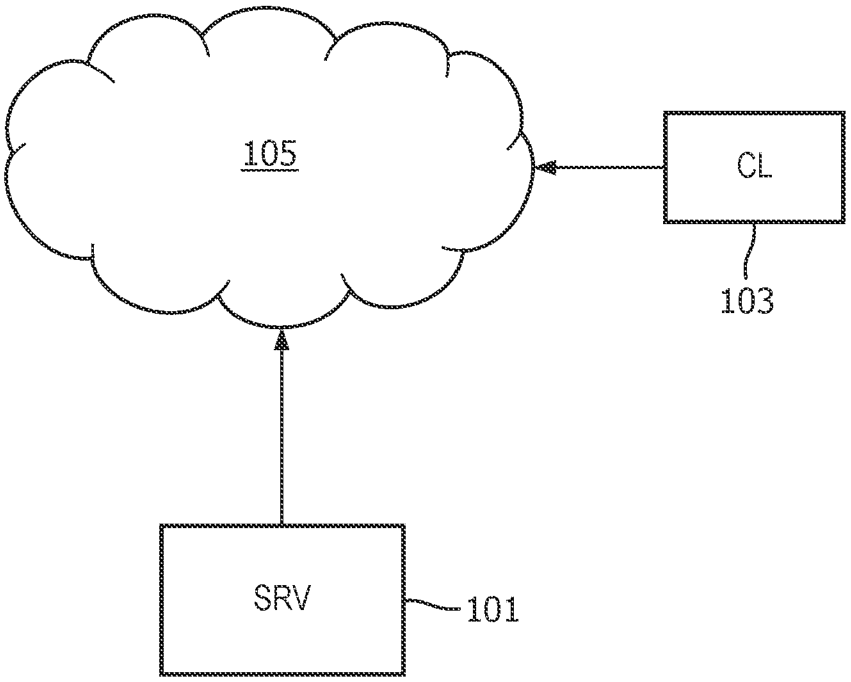
FIG. 1 illustrates an example of a client server based virtual reality system.

Virtual reality (including augmented and mixed reality) experiences allowing a user to move around in a virtual or augmented world are becoming increasingly popular and services are being developed to satisfy such demands. In many such approaches, visual and audio data may dynamically be generated to reflect a user's (or viewer's) current pose.

In the field, the terms placement and pose are used as a common term for position and/or direction/orientation (see e.g. https://en.wikipedia.org/wiki/Pose_(computer_vision)). The combination of the position and direction/orientation of e.g. a physical object, a camera, a head, or a view may be referred to as a pose or placement. Thus, a placement or pose indication may comprise up to six values/components/degrees of freedom with each value/component typically describing an individual property of the position/location or the orientation/direction of the corresponding physical object. Of course, in many situations, a placement or pose may be represented by fewer components, for example if one or more components is considered fixed or irrelevant (e.g. if all physical objects are considered to be at the same height and have a horizontal orientation, four components may provide a full representation of the pose of a physical object). In the following, the term pose is used to refer to a position and/or orientation which may be represented by one to six values (corresponding to the maximum possible degrees of freedom).

Many VR applications are based on a pose having the maximum degrees of freedom, i.e. three degrees of freedom of each of the position and the orientation resulting in a total of six degrees of freedom. A pose may thus be represented by a set or vector of six values representing the six degrees of freedom and thus a pose vector may provide a three-dimensional position and/or a three-dimensional direction indication. However, it will be appreciated that in other embodiments, the pose may be represented by fewer values.

A system or entity based on providing the maximum degree of freedom for the viewer is typically referred to as having 6 Degrees of Freedom (6DoF). Many systems and entities provide only an orientation or position and these are typically known as having 3 Degrees of Freedom (3DoF).

With 6 degrees of freedom, the user can move in all three dimensions of a 3 dimensional Cartesian coordinate system. Or, with reference to the listener: in left-right, front-back and up-down direction. The remaining three degrees of freedom are rotations along the directions of the three axes of the Cartesian coordinate system, (e.g. yaw; pitch, roll as known from aircraft maneuvering, refer, e.g., https://en.wikipedia.org/wiki/Aircraft principal axes).

Typically, the virtual reality application generates a three-dimensional output in the form of separate view images for the left and the right eyes. These may then be presented to the user by suitable means, such as typically individual left and right eye displays of a VR headset. In other embodiments, one or more view images may e.g. be presented on an autostereoscopic display, or indeed in some embodiments only a single two-dimensional image may be generated (e.g. using a conventional two-dimensional display).

Similarly, for a given viewer/user/listener pose, an audio representation of the scene may be provided. The audio scene is typically rendered to provide a spatial experience where audio sources are perceived to originate from desired positions. The audio scene may in many embodiments change dynamically with audio sources potentially moving in scene space. Also, changes in the user pose will typically result in a change in the relative position of the audio source with respect to the user's pose. Accordingly, the spatial perception of the audio source should change to reflect the new position relative to the user. The audio rendering may accordingly be adapted depending on the user pose.

The viewer or user pose input may be determined in different ways in different applications. In many embodiments, the physical movement of a user may be tracked directly. For example, a camera surveying a user area may detect and track the user's head (or even eyes (eye-tracking)). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the viewer pose may be provided by manual means, e.g. by the user manually controlling a joystick or similar manual input. For example, the user may manually move the virtual viewer around in the virtual scene by controlling a first analog joystick with one hand and manually controlling the direction in which the virtual viewer is looking by manually moving a second analog joystick with the other hand.

In some applications a combination of manual and automated approaches may be used to generate the input viewer pose. For example, a headset may track the orientation of the head and the movement/position of the viewer in the scene may be controlled by the user using a joystick.

In many systems, data describing the scene is transmitted from a central source to a local device for the individual user. For example, visual data representing view of the scene from a number of different view positions may be transmitted from a central server to a local client. Based on this visual data, a local renderer in the local device may then synthesize specific views for the viewers current position. Thus, a scene representation from a number of capture or anchor positions (independent of the current viewer pose) may be transmitted to the local device as a representation of the scene, and the local device may process this to dynamically generate views for the current viewer pose.

Similarly, the remote device/server may generate an audio scene reflecting the virtual audio environment. This may in many embodiments be done by generating audio elements that correspond to the relative position of different audio sources in the virtual audio environment with these being rendered to be perceived at the corresponding positions.

For example, a remote device may generate audio data representing an audio scene and may transmit audio components/objects/signals or other audio elements corresponding to different audio sources in the audio scene together with position information indicative of the position of these (which may e.g. dynamically change for moving physical objects). The audio elements may include elements associated with specific positions but may also include elements for more distributed or diffuse audio sources. For example, audio elements may be provided representing generic (non-localized) background sound, ambient sound, diffuse reverberation etc.

The audio data may, in many embodiments, also contain metadata descriptive of acoustic properties of the scene. This metadata may include information of (non-audio) elements that cause acoustic occlusions or reflections.

The local VR device may then render the audio elements appropriately, for example by applying appropriate binaural processing reflecting the relative position of the audio sources for the audio components. The acoustic metadata may be used to model further effects of the scene on the audio reaching the user. These may be effects directly onto the audio signals of the audio elements, or introduce additional audio elements such as reverberation.

For the audio side of a VR service, a central server may accordingly in some embodiments generate audio data representing an audio scene, and may specifically represent this audio scene by a number of audio elements that can be rendered by the local client/device. The audio elements may specifically include one or more of audio objects, audio channels, Higher Order Ambisonics.

FIG. 1 illustrates an example of such a VR system in which a central server 101 liaises with a number of remote clients 103 e.g. via a network 105, such as e.g. the Internet. The central server 101 may be arranged to simultaneously support a potentially large number of remote clients 103.

Such an approach may in many scenarios provide an improved trade-off e.g. between complexity and resource demands for different devices, communication requirements etc.

Figure 2:
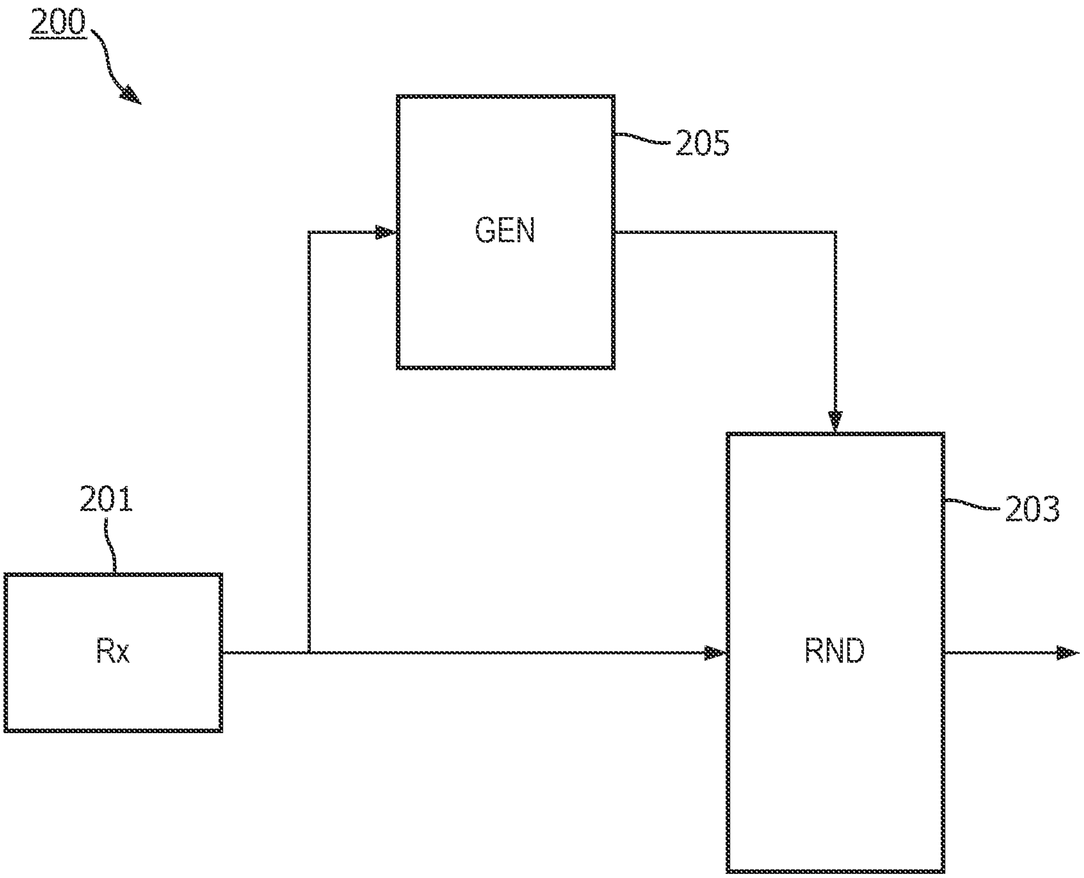
FIG. 2 illustrates an example of elements of an audio apparatus in accordance with some embodiments of the invention.

FIG. 2 illustrates elements of an audio apparatus, henceforth also referred to as an audio renderer 200, which may provide an improved audio rendering in many applications and scenarios. In particular, the audio apparatus may provide improved rendering for many VR applications, and the audio apparatus may specifically be arranged to perform the audio processing and rendering for a remote client 103 of FIG. 1.

Figure 3:
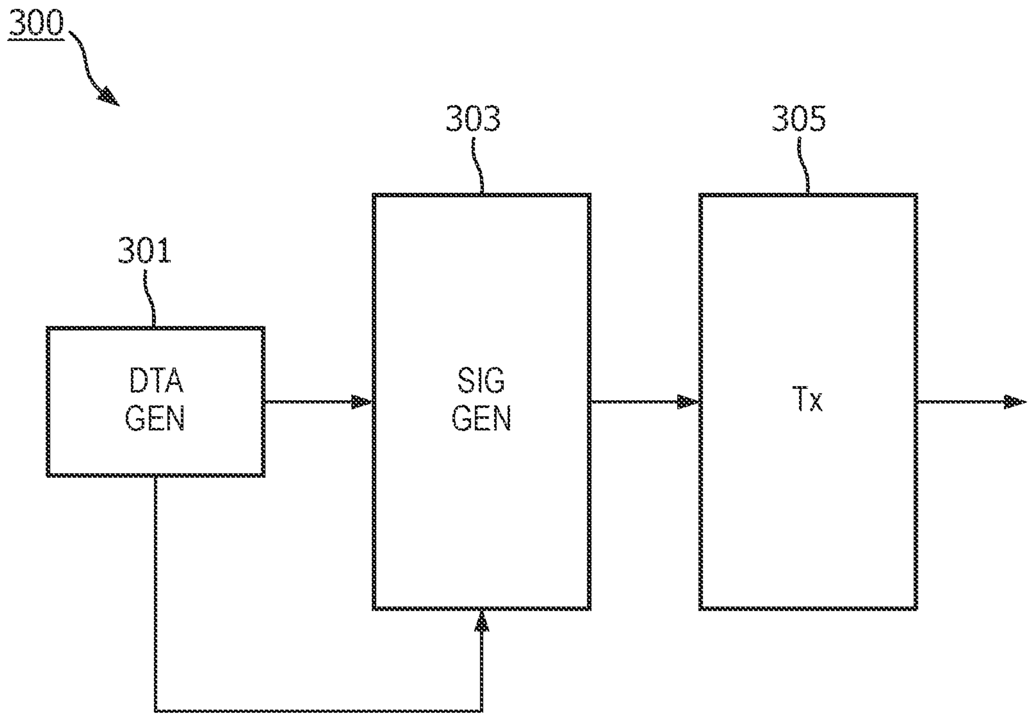
FIG. 3 illustrates an example of elements of an audio apparatus in accordance with some embodiments of the invention.

FIG. 3 illustrates elements of an audio apparatus, henceforth also referred to as an audio signal generator 300, which may generate an improved audio data signal in many applications and scenarios. In particular, the audio apparatus may provide an improved audio data signal as part of an improved audiovisual data stream for many VR applications, and the audio signal generator 300 may specifically be arranged to perform the audio processing and rendering for a VR server 101 of FIG. 1.

The audio signal generator 300 comprises an audio data generator 301 which is arranged to generate data providing a representation of the audio scene. The data may include data for a number of audio sources in the scene with the data comprising audio data that describes the audio (signal) generated by the source as well as typically spatial information providing a description of spatial properties for the scene. Such spatial data may typically include data indicating a position of the audio source in the scene and/or a description of a spatial distribution/extent of the audio source. The spatial distribution may for example reflect whether the data source is diffuse and spatially distributed (e.g. ambient or background noise) or whether it is a well-defined point source. The spatial data for a given audio source may for example indicate a size of the audio source. The audio source data for a given audio source in the audio scene may specifically comprise audio signal data and spatial property data for the audio source.

The audio generated by the audio source may typically be given as an encoded audio signal. The audio sources may typically be represented as audio objects, channels, or HOA.

An audio source may specifically be a single audio signal with associated position metadata, intended to be rendered as a point source. Additionally, spatial extent (size) may be part of the metadata, indicating that the sound source should be rendered with a specific size. Further metadata such as (frequency dependent) directivity patterns may be part of the sound source definition.

In the present example, the data characterizing the audio scene is not limited to audio sources but rather may also include a description of one or more acoustic objects. An acoustic object may be an object in the scene which may affect the acoustic environment, and specifically may be an object that may affect the audio received at at least one point in the audio scene from at least one of the audio sources. Thus, an acoustic object may be any object in the scene which may impact the propagation of audio from the audio sources. The acoustic object may typically be a passive acoustic object (as will be described later, it may typically generate audio in response to incident audio or mechanical impact). An acoustic object may be an object that has different acoustic properties than air.

The data generated for the audio scene thus includes audio sources that generate audio as well as acoustic objects that may affect the audio. In some cases, an object audio source may also be associated with a specific acoustic object.

With reference to FIG. 3, the audio data generator 301 is coupled to a signal generator 303 which is arranged to generate a data signal comprising the data for the audio scene which was generated by the audio data generator 301. Typically, the signal generator 303 generates an audiovisual data stream including both the data characterizing the audio scene as well as corresponding video data that characterizes the visual scene. Thus, the data stream characterizes the audiovisual scene. The signal generator 303 may be arranged to encode the video and audio data using any suitable encoding algorithm(s) and format(s).

The generated encoded audiovisual data stream may be fed to a transmitter 305 which is arranged to transmit the data signal over any suitable communication channel. In the specific example of FIGS. 1-3, the transmitter 305 may comprise suitable network interface allowing it to transmit the data signal to the client device 101 over the network 105.

With reference to FIG. 2, the audio renderer 200 comprises a receiver 201 which receives the data signal from the audio signal generator 300. Thus, the receiver 201 receives data representing the audio scene where the data includes input audio source data for one, and typically more, audio sources as well as acoustic object data for one, and typically more, acoustic objects.

The input audio source data may specifically describe the time and/or frequency characteristics of the generated audio and may specifically represent a single audio signal (varying with time). Typically, the data also includes spatial data for the audio source. The input audio source data for a given input audio source represented in the received data may specifically comprise audio signal data and spatial property data for the given input audio source.

The receiver 201 is coupled to a renderer 203 which is fed the data characterizing the audio data. The renderer 203 may render the audio scene, e.g. by rendering the individual audio sources individually and combining the resulting signals. The rendering may include spatial processing based on the spatial information received for the audio sources and the listening position for which the audio is generated as will be known to the skilled person. For example, for a headphone output, binaural processing may be used to generate a headphone signal with the audio sources being perceived to reach the listener from the appropriate spatial positions. For loudspeaker output a speaker rendering algorithm (e.g. VBAP) may be employed to generate the speaker signals from the audio elements.

The renderer 203 may further be arranged to process the audio sources to reflect the properties of the acoustic objects. For example, the signal level for an audio source may be reduced to correspond to a dampening resulting from an acoustic object between the audio source and the listening position.

The renderer 203 may specifically be a processing element that translates audio signals into speaker (including headphone) feed/drive signals. For example, when wearing headphones the signals are rendered using HRTFs or BRIRs while for speaker consumption the signals are mapped to speakers, depending on the relative positions of the speakers to the (virtual) positions of the sound sources and the listener.

It will be appreciated that the renderer 203 may not be limited to generating signals that are fed directly to speakers of the given application but that the generated signals may possibly be further processed. For example, the signals may be subject to loudness leveling. Dynamic Range Compression (DRC), (true) peak limiting or other processing steps. Moreover, a rendering to loudspeaker feeds may be followed by a rendering to headphone speaker feeds through binaural rendering.

The audio renderer 200 further comprises a generator 205 which is arranged to introduce an additional audio source to the scene. The generator 205 may specifically generate object audio source data for an object audio source which represents the audio emitted in the audio scene by an acoustic object from coupling of audio from at least a first audio source.

In the system, the data signal includes acoustic object data for at least one acoustic object where the acoustic object data specifically includes both acoustic coupling data and spatial property data for the first acoustic object. The acoustic object may be represented by spatial metadata providing a box-, sphere- or polygon-based spatial description. It may e.g. also be represented by two size values indicating effective width and height dimensions of the element as it is facing the listener.

Based on such data, the generator 205 generates a new audio source, henceforth referred to as an object audio source, that reflects the sound generated from the acoustic object by this coupling with other audio (i.e. the audio from the input audio source(s)). This additional audio source may then be included in the rendering of the scene. Specifically, the object audio source data may represent the additional object audio source by audio signal data and spatial data that correspond to how the audio sources are represented in the received signal. Specifically, the object audio source may be represented by audio signal data describing the generated audio and spatial data describing the position and/or extent of the generated audio.

Acoustic models may be used to model the progression of sound through an environment and specifically to model how objects affect the audio in the environment. Typically, the modelled sound waves interact with different solid-state materials. Typical acoustic models include reflection of incoming sound waves, absorption and transmission (passing through the object). The renderer 203 may take such effects into consideration when rendering the audio sources and evaluating how they are affected by the environment.

Specifically for occlusion, the model may take into account where occluding scene objects are, and what their acoustic properties are. The received data may accordingly specifically include data describing acoustic objects and may typically describe a (simplified) geometry of the objects that in most cases are also represented visually.

Figure 4:
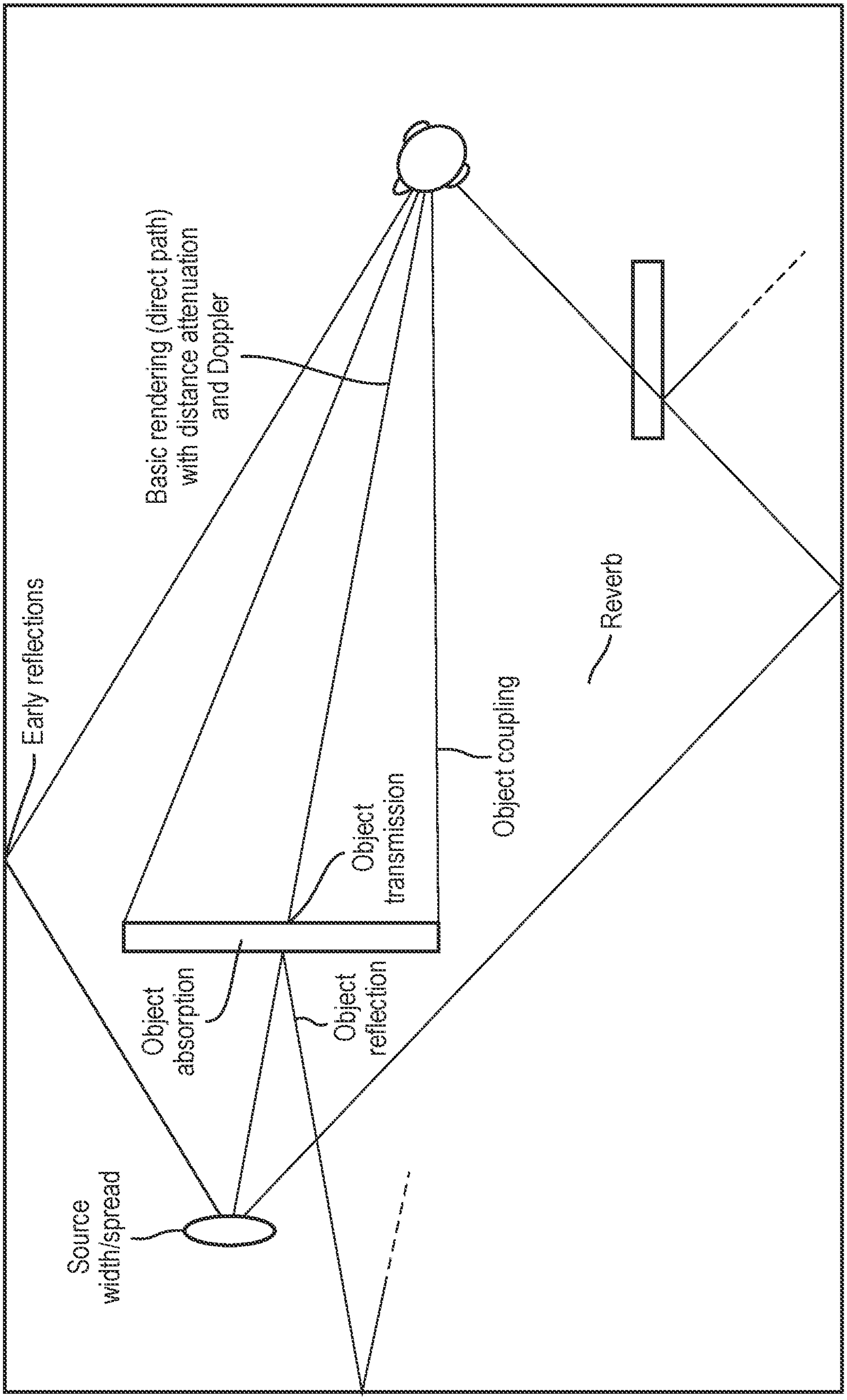
FIG. 4 illustrates an example of audio propagation in an audio scene.
Figure 5:
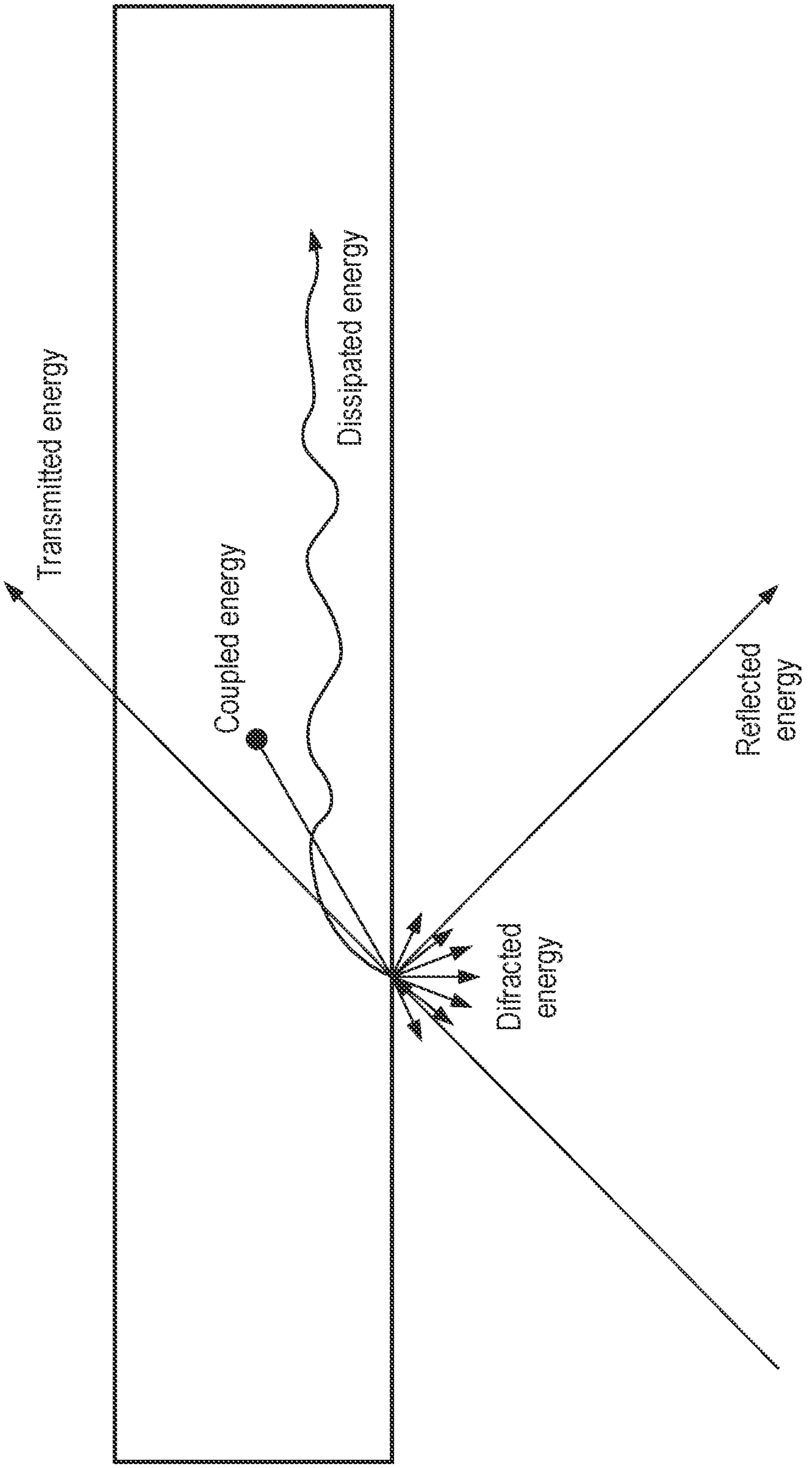
FIG. 5 illustrates an example of audio effects for an acoustic object.

Occlusion can be considered absolute, where the occluding object does not pass any sound through it, but for many objects the occlusion will not be complete but will allow some audio through. This may be represented by providing a transmission coefficient that typically indicates the (frequency dependent) portion of the energy that pass through the material such that a user may still receive some part of the direct path, as illustrated by FIGS. 4 and 5.

In most cases, a user will also receive part of the sound source's energy through reflections and reverberation. This may not be the case if the occluding element blocks all (relatively short) paths through air.

Different materials have different occluding properties. A wall occludes stronger than a curtain, and therefore the transmission coefficient will be lower for a wall than for a curtain. Also, the frequency characteristics may be different, and typically a brick wall will only pass very low frequencies. There may be different occluding materials that have properties in between the two extremes described.

The renderer 203 may thus perform a rendering which seeks to generate the 20) audio sources to reflect the different paths, whether through an acoustic object or through reflections and/or reverberations.

Figure 6:
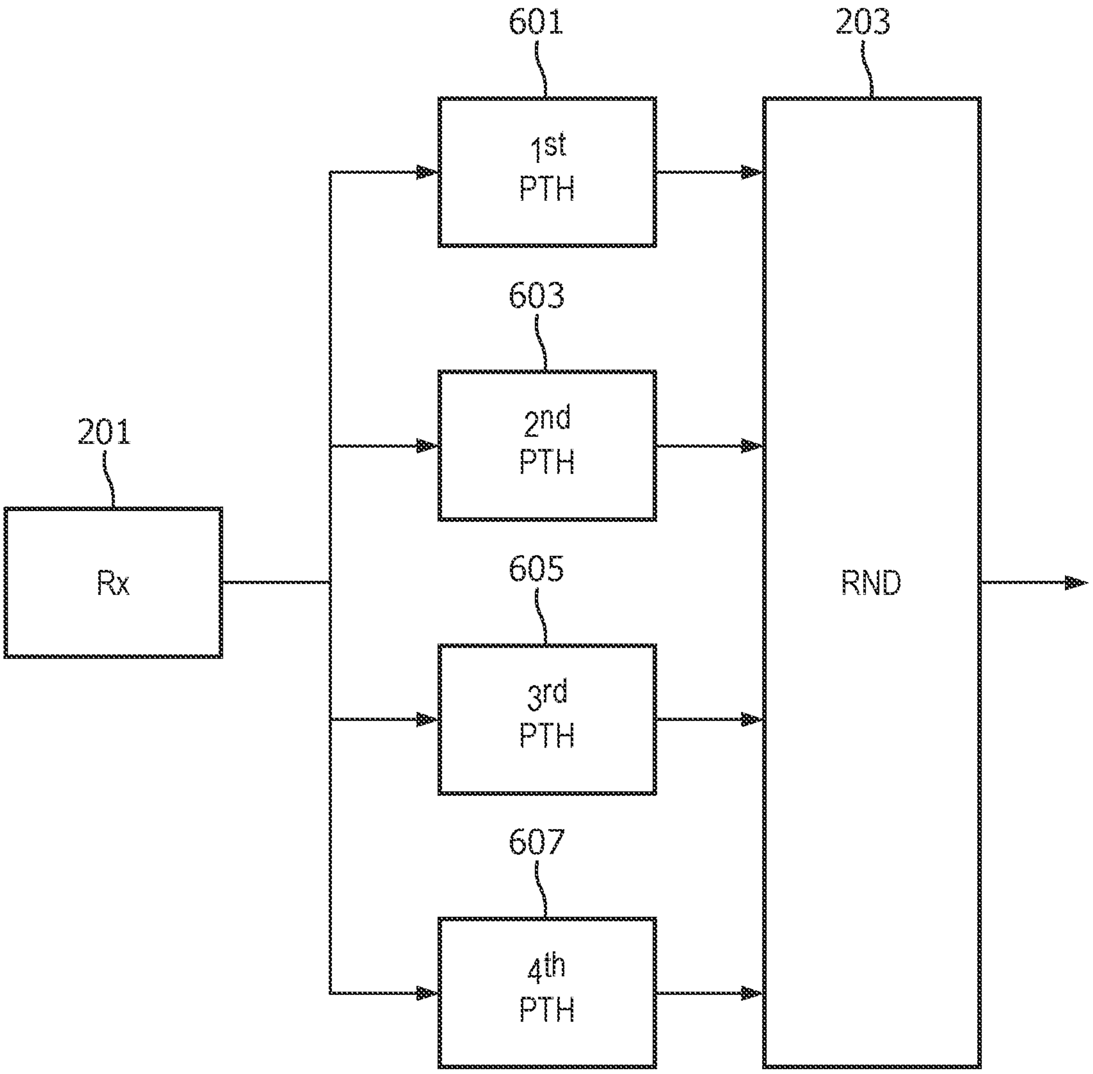
FIG. 6 illustrates an example of elements of an audio apparatus in accordance with some embodiments of the invention.

FIG. 6 illustrates an example of elements which shows how an input audio source signal may be rendered by rendering the different effects separately. The example may for example be applied to a dry sound source signal, such as an audio object.

Specifically, a first path 601 may process the audio source to reflect the reverberation in the environment. For example, the audio source signal may be filtered using a suitable reverberation filter or model. A second path 603 may process the audio source to reflect the early reflections, for example by filtering the audio source signal with a filter having coefficients corresponding to the timing and level of the individual reflections. A third 30) path 605 processes the audio source signal to represent the direct path, for example by applying an attenuation to the audio source signal dependent on the direct propagation path. It will be appreciated that not only may the timing, attenuation, and frequency response be different for the different paths, but the spatial effects may also be different. Specifically, for the reverberation the audio may be considered diffuse with no spatial definiteness, the direct path may be considered to arrive from the direction of the audio source, and the reflections may be considered to arrive from different directions depending on the specific characteristics of the audio environment and may typically also be considered to be less spatially defined than the direct path. The direct signal may be rendered to arrive directly from the audio source position and possibly with relatively little spatial spreading.

Direct path attenuation by an acoustic object may often be modelled by applying a transmission coefficient attenuating the signal from the audio source. However, the inventor has realized that in many scenarios, this may not provide a complete or ideal representation of the audio source and how this is affected by the acoustic object.

For example, this approach may be a realistic model for curtains, but not for walls. This could be attributed to the strong low-pass transmission behavior of the walls, but for other materials in between these extremes, such as thin plasterboard walls or wooden doors, there will be more high frequency content and generally less attenuation. If these cases were modelled with transmission coefficients, localization would be possible, whereas in practice this is not the case.

In the described system, the impact of an acoustic object on audio generated by the audio sources is further represented by acoustic object data that comprises acoustic coupling data and spatial property data for the acoustic object. This may be processed in a fourth path 607 that includes the audio source generator 205 by this path introducing a new audio source to the scene.

Coupling is an acoustic effect that represents how audio and vibration/(oscillating) movement of objects may interact and be converted into each other. Audio that is incident on an embodiment may cause vibration of the object whereby (some of) the audio energy may be converted into mechanical energy of the object. Also, vibrational/(oscillating) movement of an object may generate audio thereby converting vibrational/mechanical energy into audio energy. Indeed, the coupling effect may in many embodiments provide an audio effect where incident audio on an acoustic object causes this to vibrate with the vibration then producing audio.

Sound sources radiate energy and in most environments and scenes some of that energy will hit one or more acoustic objects before reaching the listener's ear. Acoustic objects may typically be spatial areas where material properties are different to air (and may typically correspond to physical objects in a real world scene or virtual objects representing physical objects for a virtual scene). On the boundaries of these elements, the acoustic impedance gives rise to a number of acoustic effects as described above, and as illustrated in e.g. FIG. 5. Such acoustic effects may typically be reflection, transmission, diffraction (scattering), as well as absorption.

For example, porous or flexible material may absorb and reflect energy, but will also pass some of the energy through to the air behind it. Otherwise, it would not be possible to hear what happens behind a curtain.

Absorbed sound/energy may be caused by different conversion effects. Some audio may be dissipated and effectively converted into heat energy in the material. However, some of the audio energy may be converted into movement of the material and may thus be converted into vibrations of the corresponding object/surface. However, whereas the first effect of conversion into heat energy effectively means that the corresponding audio energy is removed from the audio domain/environment, the second effect may cause further audio effects.

Specifically, the vibration of the acoustic object may result in air being moved by the acoustic object, and thus in the generation of sound, including at the far/occluded side of the acoustic object. Thus, the conversion of audio to vibrational movement may be followed by conversion of this vibrational movement into sound. Furthermore, the characteristics of this sound, including e.g. the spatial extent and frequency range, may depend substantially on the properties of the acoustic object and may differ substantially from sound resulting from straight transmission. For example, for sound propagation between adjoining rooms, the entire wall, door or other object may be vibrating, making localization more difficult because a large area is producing the sound rather than a relatively small sound source.

Figure 7:
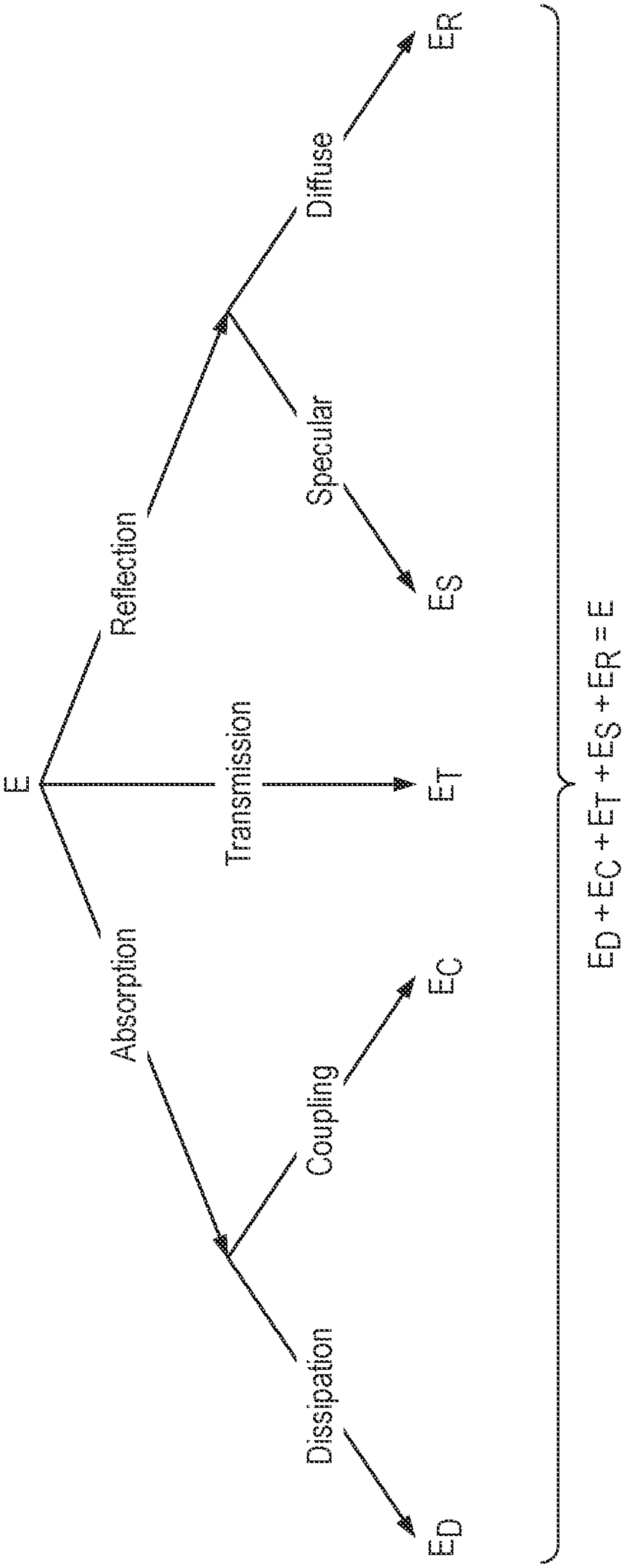
FIG. 7 illustrates relationships between audio effects for an acoustic object.

FIG. 7 illustrates an example of the relationship between the different effects that may occur. The effect of conversion audio energy and vibrational/mechanical energy is known as coupling and is mainly considered in building construction design to improve sound insulation between different parts of the building. The extent to which the different acoustic effects take place for a given acoustic object depends on the specific properties of the acoustic object including the construction and the material or combination of materials of the acoustic object.

In the system of FIGS. 1 to 3, the data signal is generated to include acoustic object data for one or more acoustic objects which include acoustic coupling data and spatial property data for the acoustic object. The acoustic coupling data comprises an indication of a property of conversion of audio energy into vibration energy and/or conversion of vibration energy into audio energy. In many situations, the acoustic coupling data may alternatively or additionally include an indication of the vibration performance of the acoustic object, and specifically of how vibration effects propagate and are distributed in the acoustic object.

Further, the data is used by the audio renderer 200 to generate a new audio source in the audio scene. Thus, in addition to the input audio sources that are described by the received data, the audio source generator 205 of the audio renderer 200 is arranged to generate object audio source data for an object audio source that represents audio emitted in the audio scene by the acoustic object from coupling of audio from at least a first input audio source. The object audio source data may specifically include audio signal data describing the audio that is generated and spatial data indicative of spatial properties of the emitted audio. Specifically, the spatial data may represent a position and extent (spatial distribution) of the generated sound.

The audio source generator 205 generates the object audio source data based on the received acoustic coupling data and spatial property data received for the acoustic object as well as on the specific audio source and the audio signal data for at least a first audio source.

As a low complexity example, the acoustic coupling data may comprise a coupling coefficient which is indicative of how much audio signal energy is generated via the coupling, and thus the coupling coefficient may be indicative of the conversion loss when converting the audio energy from the first audio source into vibrational energy and when converting this vibrational energy into audio energy. A new source may thus be generated with an energy/level corresponding to this energy, e.g. simply by scaling the first audio source signal by the coupling coefficient. The spatial data for this audio source may be generated to reflect a position and/or extent of the new source which is determined based on the position and/or spatial extent of the acoustic object. The position and/or the spatial extent/distribution of the generated new audio source is different from that resulting from straight transmission and is dependent on the spatial properties (and typically the mechanical properties) of the acoustic object. Specifically, in many embodiments, the new audio source may be generated to have a position corresponding to the position of the acoustic object and to have a spatial extent that corresponds to the size of the acoustic object. For example, if the acoustic object corresponds to a wall, the new source may be generated to originate from the entire wall, i.e. the extent of the generated new object audio source.

The generated object audio source may be rendered in the same way as that of the other audio sources. The object audio source data may be fed to the renderer 203 which may render the object audio source to be perceived with the determined characteristics and specifically with the determined position and extent. It will be appreciated that a number of different algorithms are known for rendering audio sources to have a perceived position and extent and that any suitable such approach and algorithm may be used.

In particular, there are various ways to create audio source size. This is generally achieved by rendering versions of the sound source signal at more than one position. E.g. a fourth of the energy of the signal at the four corners of the acoustic object's perceived spatial area from the listening position. Some embodiments may render versions of the object signal at more (or less) positions, and/or at different locations than the four corners of the acoustic object's spatial area, as perceived by the listener.

Figure 8:
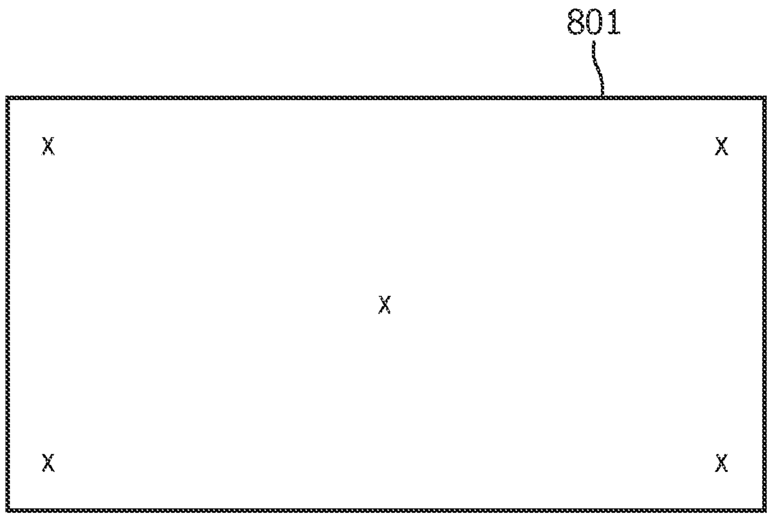
FIG. 8 illustrates an example of rendering a spatial extent of an acoustic object in accordance with some embodiments of the invention.

As a specific example, FIG. 8 illustrates how a wall or barrier may be seen from a listening position. The resulting audio from such a wall may be considered to originate from the entire wall surface rather than just from a single point. Such a perception may for example be generated by generating a sub-audio source in the center and at each corner, e.g. as indicated by X in FIG. 8. Each of these sub-audio sources may be rendered to emit the audio determined for the acoustic object corresponding to the wall. In the specific example, the level of each sub-audio sources may for example be a fifth of the total level determined for the audio source. Further, some spatial spreading, or diffusing, effects may be applied to the rendered audio (e.g. some additional reverberation or decorrelation filters (typically all-pass filters with random phase response)). The combined effect may thus lead to the perception of a single audio source having the size of the entire acoustic object/wall 801.

In more advanced embodiments, the energy of the sound source signal is distributed unevenly over the versions of the sound source signal, to have an emphasis on a certain area of the acoustic object, depending on where the received sound source is closest to the acoustic object.

The audio renderer 200 may accordingly introduce one or more new sound sources with spatial extent according to the acoustic object's size and position. The new sound source represents an acoustic object that produces sound due to the audio energy generated by another sound source turning into vibrations of the acoustic object.

In many embodiments, the audio from a plurality of audio sources may be considered. Indeed, the audio incident from the acoustic object from two audio sources may be considered. For example, the audio that is incident on the acoustic object from two different audio sources may first be determined, e.g. by superposition or ray tracing or any other algorithm. The combined audio may then be processed as if it were audio from a single source, i.e. it may e.g. be converted into vibration, the vibration behavior may be modelled, and the resulting audio may be generated therefrom.

In other embodiments, the individual audio sources may be processed individually, and the resulting output audio may be combined. Thus, in some embodiments, the audio source generator 205 may generate object audio source data to represent audio emitted in the audio scene by the acoustic object from a combined coupling of audio from the first audio source and the second audio source.

The audio source generator 205 may specifically do this by superposition of audio (signal) data generated in response to the acoustic coupling data, the spatial property data, and the audio signal data for the first audio source and audio (signal) data generated in response to the acoustic coupling data, the spatial property data, and the audio signal data for the second audio source.

In many embodiments, such combined object audio source data may be generated by the audio source signal data being generated as a filtered superposition of one or more of the audio source signals, where the filtering is at least determined by the, typically, frequency dependent coupling coefficients of the acoustic object.

In the described system, coupling metadata associated with an acoustic object is included in the data signal representing an audio scene. In many embodiments, the acoustic coupling data may represent a level and/or frequency response for the coupling to and/or from vibrational energy. In many embodiments, the coupling metadata may be in the form of a transfer function for the coupling. The transfer function may be represented by one or more coupling coefficients, such as for example one or more coefficients representing a filter transfer function for a FIR or IIR filter. In the simplest embodiment, the transfer function may be a frequency independent scaling and the acoustic coupling data may for example comprise only a single coupling coefficient indicative of the attenuation of signal energy from the incident audio energy to the generated audio energy by the coupling process.

Thus, in some embodiments, the acoustic coupling data may for a given acoustic object comprise a single coefficient indicating how the object audio source signal should be derived from the audio source signal(s) received from the audio signal generator 300. E.g.:

$$s_{g,a}[n] = \sum_{i \in D_r} c_a \cdot s_{r,i}[n] = c_a \cdot \sum_{i \in D_r} s_{r,i}[n]$$

where $s_{g,a}$ is the generated object audio source signal for acoustic object a, $D_r$ is the set of received audio source signals, $c_a$ the coupling coefficient of acoustic object a and $s_{r,i}$ is the received sound source signal i, and n is a time index (e.g. time sample). In this example, the effect of coupling from multiple audio sources are thus considered by superposition of the individual contributions.

The coupling coefficient may correspond to a broadband coupling coefficient, i.e. the frequency response may be flat for the entire audio band and only level changes are considered. However, in most cases it is beneficial to use frequency dependent coefficients, e.g. coupling coefficients may be significantly higher at low frequencies. Another example is that frequency dependent coefficients may be particularly suitable for reflecting resonances in the acoustic object, or a surface component of the acoustic object.

A frequency-dependent coupling coefficient may be provided as a filter, e.g. by coefficients for a FIR ($b_i$) or IIR ($b_i$, $a_j$) filter.

$$C_a(z) = \frac{\sum_{i=1}^{I} b_a z^{-i}}{\sum_{j=1}^{J} a_j z^{-j}}$$

The contribution to the generated object audio source signal may be obtained by filtering the received audio source signals with the filter coefficients. E.g. in the frequency domain:

$$S_{g,a}(z) = \sum_{i \in D_r} S_{r,i}(z) \cdot C_a(z)$$

or a FIR in the time domain:

$$s_{g,a}[n] = \sum_{i \in D_r} (s_{r,i} * c_a)[n] = \left(\sum_{i \in D_r} s_{r,i}\right) * c_a[n]$$

where * denotes convolution.

Alternatively, frequency dependent coupling coefficients may be provided for certain frequency bands, where each such parameter band is defined on a part of the frequency spectrum. The parameter bands may be defined in terms of FFT bins, MDCT bins or subband indices.

In such an approach, in most embodiments the object audio source signal may be generated by multiplying the scalar coupling coefficient of each parameter band with all FFT-bins or subband signals in the corresponding parameter band. For example:

$$s_{g,a}[b, n] = \sum_{i \in D_r} s_{r,i}[b, n] \cdot c_{a,B(b)}$$

where b denotes a STFT-bin (or subband index) and B(b) is a function that returns the parameter band index given STFT-bin (or subband index) b.

The values of the coupling coefficients are typically between 0 and 1, where 0 represents the situation where no energy is transferred by coupling via the acoustic object and a value of 1 indicates that the full incident audio signal is translated into the object audio source signal.

The generated object audio source data may also include spatial data which typically may represent the spatial position and/or extent of the generated object audio source. This data may typically reflect the spatial data of the acoustic object, i.e. specifically the position and/or extent of the acoustic object. However, in some embodiments and scenarios, it may also be dependent on the position and/or extent of the original audio source.

In many embodiments, the object audio source is generated to have a spatial extent determined from the spatial extent of the acoustic object, and specifically it may be determined to be the same as the acoustic object. For example, for a wall, the audio of the corresponding object audio source may be considered to be radiated from the entire wall.

In some embodiments, the extent of the generated object audio source may be determined by the extent of a surface of the acoustic object, being smaller than the extent of the acoustic object. This may be because the surface is more prone to generate audio in response to coupling or vibrations in the acoustic object than other surfaces of the acoustic object.

Similarly, in many embodiments, the object audio source is generated to have a spatial position determined from the spatial position of the acoustic object, and specifically it may be determined to be the same as the acoustic object. For example, for a piece of furniture, the audio of the corresponding object audio source may be considered to be radiated from the position of the piece of furniture rather than from the position of the original audio source.

As some specific examples, an acoustic object could be represented by its center position $\overline{p}=(p_x, p_y, p_z)$ and extent $\overline{d}=(d_x, d_y, d_z)$ around the center position. The three values in vector $\overline{d}$ may indicate the three spatial dimensions of a box or ellipsoid approximation of the acoustic object. The dimensions $\overline{d}$ could indicate the dimensions directly with respect to the coordinate axes, or in combination with rotation data $\overline{r}=(r_y, r_p, r_r)$ that indicate a subsequent yaw, pitch and roll rotation angles on the dimensions.

Alternatively, the position vector $\overline{p}$ indicates a start position from which the acoustic object's extent, or more specifically shape, is defined. For example, polygons may be used to define the shape of the acoustic objects by sets polygons $Q_i$ each consisting of at least three coordinate pairs $E_{i,j}=\{(e_{x1,i,j}, e_{y1,i,j}, e_{z1,i,j}), (e_{x2,i,j}, e_{y2,i,j}, e_{z2,i,j})\}$ defining the edges of the polygon. The coordinate pairs could be expressed in absolute coordinates or with respect to the position vector.

The spatial properties of the generated object audio source may be taken over directly from the spatial extent of the acoustic element. E.g. the center position $\overline{p}$, and spatial extent expressed by $\overline{d}$ and $\overline{r}$, or alternatively the polygon description $Q_i$. In other embodiments, where the acoustic object is described by polygons, the dimensions may be derived from the polygon definitions and translated into a different representation, such as a vector $\overline{d}$ where:

$$d_x = \max\left(\max_{i,j} e_{x1,i,j}, \max_{i,j} e_{x2,i,j}\right) - \min\left(\min_{i,j} e_{x1,i,j}, \min_{i,j} e_{x2,i,j}\right)$$

$$d_y = \max\left(\max_{i,j} e_{y1,i,j}, \max_{i,j} e_{y2,i,j}\right) - \min\left(\min_{i,j} e_{y1,i,j}, \min_{i,j} e_{y2,i,j}\right)$$

$$d_z = \max\left(\max_{i,j} e_{z1,i,j}, \max_{i,j} e_{z2,i,j}\right) - \min\left(\min_{i,j} e_{z1,i,j}, \min_{i,j} e_{z2,i,j}\right)$$

In some embodiments, where coupling data is given for each polygon, the spatial extent of the generated audio source may be determined only by the polygons with coupling coefficients describing vibration to audio transfer that is larger than 0.

In some embodiments, the spatial properties of the generated object audio source may only depend on the spatial properties of the acoustic object. However, in other embodiments, the spatial properties may also depend on a position of the audio source relative to the acoustic object and/or a listening position for which the audio is rendered.

Some examples of this may include the position being determined by the part of the acoustic object that is closest to the audio source, or by the surface (e.g. polygon) facing the audio source that is most efficient in generating coupled audio. More specifically the polygon with the highest coupling coefficient describing vibration to audio transfer. Alternatively, the position may be determined by a weighted average of polygon positions weighed by their respective vibration to audio coupling coefficients.

Polygon positions, here, may be considered by their average position, e.g.:

$$\overline{p} = \left(\sum_{j=1}^{J} e_{x1,i,j}, \sum_{j=1}^{J} e_{y1,i,j}, \sum_{j=1}^{J} e_{z1,i,j}\right)$$

Spatial properties of the generated audio source may depend on the listening position. The position of the generated object audio source may be chosen as the point of the acoustic object that is closest to the listening position. The spatial extent of the generated object audio source may not be expressed in terms of absolute object size, but in terms of a two-dimensional perceived extent, i.e. the width and height of the acoustic object facing the listening position. Similarly, this perceived spatial extent may be expressed in two angles, indicating the relative height and width of the acoustic object from the perspective of the listening position.

Alternatively, the position and spatial extent may be determined by the surface area that is most directly facing the listening position. E.g. the average position and extent of the polygon k of which the normal vector ($\overline{n}_j$) is most in line with the vector ($\overline{w}_j$) determined by the line between the average position of the polygon and the listening position.

$$k = \arg\min_j(\overline{n}_j - \overline{w}_j)$$

with x being the cross-product of two vectors.

In other embodiments, spatial properties of the generated object audio source depend on both the original audio source position and the listening position. For example, the position may be determined by the point where the direct line between the original audio source and listening position intersects with the acoustic object closest to the listening positions. The spatial extent of the generated object audio source may then be defined with respect to that position.

The previous description has focused on scenarios in which a coupling transfer function is considered that is related the coupling audio signal being generated to the audio incident on the acoustic object, i.e. reflecting the effect of audio being converted to vibration and then back to audio.

However, in other embodiments, a coupling transfer function may be provided that refers to the conversion of audio into vibrational movement of the acoustic object. Alternatively or additionally, a coupling transfer function may be provide that refers to the conversion of vibrational movement of the acoustic object into audio.

In many embodiments, both an input coupling transfer function reflecting coupling from audio to vibration and an output coupling transfer function reflecting coupling from vibration to audio may be provided. Thus, coupling metadata may be provided which consist of two parts where one part describes the translation from incoming audio signals into vibration signals and the second part describes the translation from vibration signals into audio signals. In such a case, the overall coupling effect/transfer function may be determined as the combination of the input and output transfer functions, e.g.:

$$c_a = c_{a,a2v} * c_{a,v2a}$$

where * denotes (time domain) convolution, and $c_{a,a2v}$ and $c_{a,v2a}$ are time domain filters representing the input coupling transfer function and the output coupling transfer function respectively.

An approach providing individual partial transfer functions may provide a number of benefits. The audio source generator 205 may be arranged to determine the vibration of the acoustic object and then from this determine the audio emitted from the object audio source. This may allow more complex and detailed considerations.

For example, in many embodiments, the audio source generator 205 may be arranged to consider a physical model of the acoustic object. The physical model may be a model of the mechanical performance and/or operation of the acoustic object. For example, it may model the construction and configuration of the acoustic object and how this reacts to vibrations. For example, the model may be arranged to model how vibrations are distributed and propagate in the acoustic object.

The model may be evaluated to determine the vibrations in the acoustic objects including for example how the vibrations are mechanically dampened in the system. The resulting audio may then be generated by using the output coupling transfer function to determine the emitted audio from the determined vibration. As another example, the model may reflect resonant behavior and e.g. model ringing effects where vibrations may continue even after the source of the vibration has ended.

The approach may specifically be used to determine a spatial distribution of vibration and the resulting spatial distribution of the emitted audio. For example, a specific vibration may be induced at one small area of the acoustic object, e.g. by a highly directional audio source being focused on a small area of the acoustic object (or e.g. an audio source being very close to one part of the acoustic object). The vibration effect throughout the acoustic object may then be determined by evaluating the physical model. The acoustic object may be divided into smaller parts and for each part the average vibration may be determined and a corresponding audio signal may be determined by applying the output coupling transfer function to this vibration. In this way, a spatially distributed audio source reflecting the audio generated by coupling may thus be generated.

In the example, the vibration causing the audio to be generated is a result of audio reaching the acoustic object. However, in other embodiments, vibration may result from other sources. Specifically, in many scenarios, the vibration may be vibration resulting from a time varying force being applied to the acoustic object.

Indeed, physical interactions (e.g. knocking, etc.) may also turn acoustic objects into sound sources via the coupling effect. For example: drilling in a wall is audible because the wall makes most of the noise, not the drill itself. Similarly, coupling also occurs between physically connected scene objects. (e.g. causing the drilling to be audible throughout the building).

This may be modelled by the coupling coefficient being split into a coefficient that indicates which portion of incoming energy is translated into vibration energy, and a coefficient that describes the relation between vibration energy and the audio signal.

This vibration modelling of acoustic objects may be based on additional coefficients describing the transfer of vibrations between (physically) connected acoustic objects, and thus the approach may also be used to evaluate the mechanical interaction between different acoustic objects.

Thus, a coupling coefficient can represent a transfer from input audio to output audio (in the sense that it translates audio signals describing sound waves reaching the acoustic object directly into an audio signal that is radiated out by the acoustic object), but it can also be split into two components where one coefficient component translates the audio signals of the incoming sound waves into vibration signals in the acoustic object, while the other translates those vibration signals into audio signals radiated out by the acoustic object.

This can be useful in more advanced embodiments where acoustic objects can be in contact with each other and thus transfer the vibration signals from the element that captures it to another acoustic object that isn't exposed directly to the sound waves. For example, when there is a loud sound system playing music in one room, it may be heard in the neighboring room through the wall between the two rooms. However, the vibrations would typically be transferred into other parts of the building structures causing listeners in other rooms to hear the bass of the music too, even if their walls, ceiling and floor is not directly neighboring the room with the music.

Another example is a (virtual) portable speaker or phone is playing audio in the modelled scene. As soon as the speaker or phone is in contact with the table top, the coupling is much stronger between the device and the table top. This is because there is a high coupling from the sound source (the loudspeaker) to its casing. However, the vibrations of the casing itself are hardly audible, whereas these vibrations are very effectively transferred into the table top by contact. The table top, then, acts as a sound board that translates its vibrations into a louder radiated sound.

Using this intermediate step therefore allows modelling transfers of vibration signals between acoustic objects for a more realistic simulation of an audio environment.

The exact data which is provided in the data signal, as well as the specific syntax used, may be different in different embodiments.

For example, for parameter band data, the parameter band definitions may be predefined, or indicated in the transmission. A bitstream field may indicate one of several predefined banding definitions, or the parameter band definitions may be carried in the bitstream explicitly as band boundaries or bandwidths in terms of frequencies, FFT-bins or subband indices.

An example bitstream syntax that supports both banded frequency coefficients and filter coefficient is shown in the following:

| Syntax | #bits |
|---|---|
| acousticElement( ) | |
| { | |
| posX; | 8 |
| posY; | 8 |
| posZ; | 8 |
| oriYaw; | 6 |
| oriPitch; | 6 |
| oriRoll; | 6 |
| sizeX; | 6 |
| sizeY; | 6 |
| sizeZ; | 6 |
| if (parBands) | 1 |
| { | |
| bandDefIdx, | 3 |
| for b = 0:nrBands(bandDefIdx) | |
| { | |
| couplingCoeff[b]; | 5 |
| reflCoeff[b]; | 5 |
| dissCoeff[b]; | 5 |
| } | |
| } | |
| else /* Filter coefficients */ | |
| { | |
| fltOrder; | 2 |
| for c = 1:fltOrder+1 | |
| { | |
| couplingCoeffB[c]; | 7 |
| reflCoeffB[c]; | 7 |
| dissCoeffB[c]; | 7 |
| } | |
| if (iirFilter) | 1 |
| { | |
| for c =1:fltOrder+1 | |
| { | |
| couplingCoeffA[c]; | 7 |
| reflCoeffA[c]; | 7 |
| dissCoeffA[c]; | 7 |
| } | |
| } | |
| } | |

-continued

| Syntax | #bits |
|---|---|
| } | |

Alternatively, the acoustic object metadata, and more specifically the coupling coefficient metadata and optionally banding information, may be described in a text-based file. For example, as an XML file or JSON format.

As an example, acoustic element 3 may be defined by a center position $\overline{p}_{a,3}$=(posX,posY,posZ)=(0,4,1.5), orientation oriYaw=0, oriPitch=0, oriRoll=0 and with dimensions $\overline{d}$=(sizeX, sizeY, sizeZ)=(20, 0.1, 3). The corresponding value of bitstream field parBands may be 1, and bandDefIdx may be 0, which may be referring to the banding definition indicated in the table below.

| Band index | Band start frequency (Hz) | Band stop frequency (Hz) |
|---|---|---|
| 0 | 0 | 30 |
| 1 | 30 | 100 |
| 2 | 100 | 500 |
| 3 | 500 | 1000 |
| 4 | 1000 | 2500 |
| 5 | 2500 | 8000 |
| 6 | 8000 | $f_s/2$ |

The seven values of couplingCoeff in the bitstream may be as indicated in the table below.

| Band index (i.e. b) | couplingCoeff[b] | $c_3$[b] (dB) |
|---|---|---|
| 0 | 9 | −9 |
| 1 | 18 | −20 |
| 2 | 20 | −25 |
| 3 | 25 | −50 |
| 4 | 27 | −Inf |
| 5 | 27 | −Inf |
| 6 | 27 | −Inf |

For the dequantized values the dequantization vector from the table below is used.

| Quantization index | Coupling coefficient value (dB) |
|---|---|
| 0 | 0 |
| 1 | −1 |
| 2 | −2 |
| 3 | −3 |
| 4 | −4 |
| 5 | −5 |
| 6 | −6 |
| 7 | −7 |
| 8 | −8 |
| 9 | −9 |
| 10 | −10 |
| 11 | −11 |
| 12 | −12 |
| 13 | −13 |
| 14 | −14 |
| 15 | −15 |
| 16 | −16 |
| 17 | −18 |
| 18 | −20 |
| 19 | −22.5 |
| 20 | −25 |
| 21 | −30 |
| 22 | −35 |
| 23 | −40 |
| 24 | −45 |

-continued

| Quantization index | Coupling coefficient value (dB) |
|---|---|
| 25 | −50 |
| 26 | −60 |
| 27 | −Inf |
| 28-31 | Reserved |

Let $s_{r,0}$ be the STFT representation of the only active audio source signal, representing an omnidirectional sound source at position $\bar{p}_{s,0}=(1, -2, 0.5)$, while the listening position is $\bar{p}_i=(5, 10, 1.8)$. The signal of the generated audio object source is calculated for all STFT bins k in parameter band b by:

$$S_{g,3}[n,k]=S_{r,i}[n,k]\cdot 10^{c_3[b]/20}$$

The spatial data associated with the generated audio object source is a center position $\bar{p}_{g,3}=(0, 4, 1.5)$ and dimension $\bar{d}_{g,3}=(20, 0.1,3)$, taken from the acoustic object. In the above example, the attenuation due to the distance between the original audio source and the acoustic object and the attenuation due to the distance between the generated audio object source and the listening position are ignored. In practice, the energy of the signal would disperse over an increasingly larger area of the wavefront, causing an attenuation factor that is typically proportional to $1/r^3$ with r the distance from the sound source. Such attenuation gains can be calculated based on the positions and dimensions of the sound source, acoustic object and the listening position.

Finally, in the renderer, the generated signal will be rendered with a frequency domain HRTF ($H_{LEFT}$ [k], $H_{RIGHT}$ [k]), e.g. obtained by applying an FFT on the time domain filters for left and right.

$$Y_{LEFT}[n,k]=S_{g,3}[n,k]\cdot H_{LEFT}[k]$$

$$Y_{RIGHT}[n,k]=S_{g,3}[n,k]\cdot H_{RIGHT}[k]$$

Where $Y_{LEFT}$ and $Y_{RIGHT}$ are the complex STFT-domain signals for the left and right headphone speaker.

The approach may provide improved performance and improved rendering and representation in many scenarios. Improved performance may e.g. often be achieved in the following specific scenarios:

- A first audio source is occluded to the listener in its direct path by an acoustic object but has significant indirect paths through the air via which a significant portion of the first audio source's energy still reaches the listener.
  - In this case the acoustic object becomes an additional audio source that, together with the transmitted audio and reflections, creates a more realistic rendering of the audio environment.
  - An example is a room divider with a source placed behind it from the listener's perspective.
- A first audio source is fully occluded by one or more acoustic objects to the listener, with no significant paths through the air to the listener.
  - In this case, the acoustic object becomes an additional audio source that may often replace one or more audio sources and thus create both a more realistic rendering of the audio environment and reduce the computational complexity.
  - An example is a scenario where there are two neighboring rooms separated by a wall and a closed door.
- A first audio source is in direct contact with the acoustic object.
  - In this case, the coupling coefficient is different from the coupling with audio waves and may cause amplification of the loudness, because the vibrations of the audio source are more directly taken over by the acoustic object.
  - An example is a scenario where a speaker, like a phone playing audio, is placed onto a table, where the table acts as a sound board.
- A first audio source is not occluded to the listener by the acoustic object but does introduce coupling energy into the acoustic object.
  - In this case the acoustic object becomes an additional audio source that creates a perceived widening of the first audio source.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to “a”, “an”, “first”, “second” etc. do not preclude a plurality. Reference signs in the claims are provided merely as a clarifying example shall not be construed as limiting the scope of the claims in any way.

The invention claimed is:

1. An audio apparatus comprising:

a receiver circuit, wherein the receiver circuit is arranged to receive a signal, wherein the signal comprises data for an audio scene, wherein the data comprises input audio source data and acoustic object data, wherein the input audio source data is for at least one audio source(s), wherein the acoustic object data is for at least one acoustic object, wherein the acoustic object data comprises acoustic coupling data and spatial property data, wherein the acoustic coupling data is indicative of a property of conversion of audio energy into vibration/mechanical energy and/or conversion of vibration/mechanical energy into audio energy;

a generator circuit, wherein the generator circuit is arranged to generate object audio source data for an object audio source, wherein the object audio source data represents audio emitted in the audio scene by the acoustic object, wherein the audio emitted in the audio scene is coupled from the at least one audio source(s), wherein the generator circuit is arranged to generate the object audio source data in response to the acoustic coupling data, the spatial property data, and the input audio source data, wherein the generator circuit is arranged to generate the object audio source data so as to represent the object audio source such that the object audio source has a spatial extent determined in response to the spatial property data; and a renderer circuit, wherein the renderer circuit is arranged to render the audio scene, wherein the rendering comprises rendering the object audio source data, wherein the acoustic object is represented by spatial metadata, wherein the spatial metadata provides a spatial description.

2. The audio apparatus of claim 1, wherein the generator circuit is arranged to determine at least one of an audio level and a frequency response for audio of the object audio source data in response to the acoustic coupling data.

3. The audio apparatus of claim 1, wherein the spatial description is selected from the group consisting of a box, a sphere, and a polygon-based spatial description.

4. The audio apparatus of claim 1, wherein the acoustic object is represented by a width value and a height value, wherein the width value indicates an effective width of the acoustic object, wherein the height value indicates an effective height of the acoustic object.

5. The audio apparatus of claim 4, wherein the effective width of the acoustic object is with respect to a listener, wherein the effective height of the acoustic object is with respect to the listener.

6. The audio apparatus of claim 1, wherein the acoustic object is represented by a width angle and a height angle, wherein the width angle indicates an effective width of the acoustic object, wherein the height angle indicates an effective height of the acoustic object.

7. The audio apparatus of claim 6, wherein the effective width of the acoustic object is with respect to a listening position, wherein the effective height of the acoustic object is with respect to the listening position.

8. The audio apparatus of claim 1, wherein the generator circuit is arranged to determine at least one of an audio level and a frequency response for audio of the object audio source data in response to the acoustic coupling data.

9. The audio apparatus of claim 1, wherein the acoustic coupling data comprises a first set of coupling coefficients for the acoustic object, wherein the set of coupling coefficients are indicative of a coupling transfer function for the acoustic object.

10. The audio apparatus of claim 1, wherein the generator circuit is arranged to generate the object audio source data so as to represent the object audio source having a spatial position corresponding to a position of the acoustic object as indicated by the spatial property data.

11. The audio apparatus of claim 1, wherein the generator circuit is arranged to generate the object audio source data in response to a position of the at least one audio source(s) and a position of the acoustic object indicated by the spatial property data.

12. The audio apparatus of claim 1, wherein generator circuit is arranged to generate the object audio source data in response to a listening position and a position of the acoustic object indicated by the spatial property data.

13. The audio apparatus of claim 1, wherein the signal comprises input audio source data for a second audio source, wherein the object audio source data represents audio emitted in the audio scene by the acoustic object from a combined coupling of audio from the at least one audio source(s) and the second audio source.

14. An audio apparatus comprising:

a data generator circuit, wherein the data generator circuit is arranged to generate data for an audio scene, wherein the data comprises input audio source data and acoustic object data, wherein the input audio source data is for at least one audio source(s), wherein the acoustic object data is for at least one acoustic object, wherein the acoustic object data comprises acoustic coupling data and spatial property data, wherein the acoustic coupling data is indicative of a property of conversion of audio energy into vibration/mechanical energy and/or conversion of vibration/mechanical energy into audio energy;

a signal generator circuit, wherein the signal generator circuit is arranged to generate a data signal, wherein the data signal comprises the data for the audio scene; and a transmitter circuit, wherein the transmitter circuit is arranged to transmit the data signal, wherein the acoustic object is represented by spatial metadata, wherein the spatial metadata provides a spatial description.

15. A method of processing audio, the method comprising:

receiving a signal, wherein the signal comprises data for an audio scene, wherein the data comprises input audio source data for at least and acoustic object data, wherein the input audio source data is for at least one audio source(s), wherein the acoustic object data is for at least one acoustic object in the audio scene, wherein the acoustic object data comprises acoustic coupling data and spatial property data, wherein the acoustic coupling data is indicative of a property of conversion of audio energy into vibration/mechanical energy and/or conversion of vibration/mechanical energy into audio energy;

generating object audio source data for an object audio source, wherein the object audio source data represents audio emitted in the audio scene by the acoustic object, wherein the audio emitted in the audio scene is coupled from the at least one audio source(s), wherein the generating of the object audio source data is in response to the acoustic coupling data, the spatial property data, and the input audio source data, wherein the generating of the object audio source data is arranged to represent the object audio source such that the object audio source has a spatial extent determined in response to the spatial property data; and rendering the audio scene, wherein the rendering comprises rendering the object audio source data.

16. A computer program stored on a non-transitory medium, wherein the computer program when executed on a processor performs the method as claimed in claim 15.

17. The method of claim 15, wherein the acoustic object is represented by spatial metadata, wherein the spatial metadata provides a spatial description.

18. The method of claim 17, wherein the spatial description is selected from the group consisting of a box, a sphere and a polygon-based spatial description.

19. The method of claim 15, wherein the acoustic object is represented by a width value and a height value, wherein the width value indicates an effective width of the acoustic object, wherein the height value indicates an effective height of the acoustic object.

20. The method of claim 19, wherein the effective width of the acoustic object is with respect to a listener, wherein the effective height of the acoustic object is with respect to the listener.

21. The method of claim 15, wherein the acoustic object is represented by a width angle and a height angle, wherein the width angle indicates an effective width of the acoustic object, wherein the height angle indicates an effective height of the acoustic object.

22. The method of claim 21, wherein the effective width of the acoustic object is with respect to a listening position, wherein the effective height of the acoustic object is with respect to the listening position.

23. The method of claim 15, wherein the generator circuit is arranged to determine at least one of an audio level and a frequency response for audio of the object audio source data in response to the acoustic coupling data.

24. The method of claim 15, wherein the acoustic coupling data comprises a first set of coupling coefficients for the acoustic object, wherein the set of coupling coefficients are indicative of a coupling transfer function for the acoustic object.

25. The method of claim 15, wherein the generator circuit is arranged to generate the object audio source data so as to represent the object audio source having a spatial position corresponding to a position of the acoustic object as indicated by the spatial property data.

26. The method of claim 15, wherein the generator circuit is arranged to generate the object audio source data in response to a position of the at least one audio source(s) and a position of the acoustic object indicated by the spatial property data.

27. The method of claim 15, wherein the generator circuit is arranged to generate the object audio source data in response to a listening position and a position of the acoustic object indicated by the spatial property data.

28. The method of claim 15, wherein the signal comprises input audio source data for a second audio source, wherein the object audio source data represents audio emitted in the audio scene by the acoustic object from a combined coupling of audio from the at least one audio source(s) and the second audio source.

29. A method of generating an audio data signal, the method comprising:

generating data for an audio scene, wherein the data comprises input audio source data and acoustic object data, wherein the input audio source data is for at least one audio source(s), wherein the acoustic object data is for at least one acoustic object, wherein the acoustic object data comprises acoustic coupling data and spatial property data, wherein the acoustic coupling data is indicative of a property of conversion of audio energy into vibration/mechanical energy and/or conversion of vibration/mechanical energy into audio energy;

generating the audio data signal, wherein the audio data signal comprises the data for the audio scene, wherein the generator circuit is arranged to generate the object audio source data so as to represent the object audio source such that the object audio source has a spatial extent determined in response to the spatial property data; and transmitting the audio data signal.

30. A computer program stored on a non-transitory medium, wherein the computer program when executed on a processor performs the method as claimed in claim 29.

* * * * *